United States Patent
Lim et al.

(10) Patent No.: US 11,283,127 B2
(45) Date of Patent: Mar. 22, 2022

(54) BATTERY PACK WITH SURFACE PRESSURE PATCH

(71) Applicants: Hyundai Motor Company, Seoul (KR); Kia Motors Corporation, Seoul (KR)

(72) Inventors: Hae Kyu Lim, Gyeonggi-do (KR); Yong Hwan Choi, Gyeonggi-do (KR); Tae Hyuck Kim, Chungcheongnam-do (KR); Yong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 16/398,812

(22) Filed: Apr. 30, 2019

(65) Prior Publication Data
US 2020/0119320 A1   Apr. 16, 2020

(30) Foreign Application Priority Data
Oct. 10, 2018   (KR) .......... 10-2018-0120681

(51) Int. Cl.
*H01M 50/20* (2021.01)
*H01M 50/24* (2021.01)
*H01M 50/147* (2021.01)
*H01M 50/502* (2021.01)
*H01M 50/578* (2021.01)

(52) U.S. Cl.
CPC ......... *H01M 50/20* (2021.01); *H01M 50/147* (2021.01); *H01M 50/24* (2021.01); *H01M 50/502* (2021.01); *H01M 50/578* (2021.01); *H01M 2220/20* (2013.01)

(58) Field of Classification Search
CPC .. H01M 2/043; H01M 2/1077; H01M 2/1083; H01M 2/1094; H01M 2/206; H01M 2/345; H01M 10/0481; H01M 2220/20; H01M 50/20; H01M 50/242; H01M 50/502; H01M 50/578; Y02E 60/10
See application file for complete search history.

(56) References Cited

U.S. PATENT DOCUMENTS

| | | | |
|---|---|---|---|
| 2018/0108881 A1* | 4/2018 | Jin | H01M 50/116 |
| 2018/0145291 A1* | 5/2018 | Uchiyama | H01M 10/0481 |
| 2018/0175343 A1* | 6/2018 | Choi | B60L 50/64 |

FOREIGN PATENT DOCUMENTS

| | | |
|---|---|---|
| KR | 10-2018-0036863 A | 4/2018 |
| KR | 10-2018-0068379 A | 6/2018 |

* cited by examiner

*Primary Examiner* — Brittany L Raymond
(74) *Attorney, Agent, or Firm* — Mintz Levin Cohn Ferris Glovsky and Popeo, P.C.; Peter F. Corless

(57) ABSTRACT

A battery pack is provided and includes a battery module that has a plurality of stacked battery cells and an end cover disposed on an outer side to face an outermost battery cell. A case having a receiving space accommodates the battery module and the receiving space has a side wall facing the end cover. A surface pressure patch is disposed between the end cover of the battery module and the side wall which are disposed in the receiving space, and is configured to apply a pressure to an inside of the battery module when an interval between the end cover and the side wall is closer to a predetermined interval due to swelling of the battery cell.

4 Claims, 5 Drawing Sheets

BATTERY PACK WITH SURFACE PRESSURE PATCH

CROSS REFERENCE TO RELATED APPLICATION

The present application claims priority of Korean Patent Application No. 10-2018-0120681 filed on Oct. 10, 2018, the entire contents of which is incorporated herein for all purposes by this reference.

BACKGROUND

Field of the Invention

The present invention relates to a battery pack capable of generating a uniform surface pressure of a battery module caused by swelling occurring in a battery cell and preventing a battery module or a battery pack from being deformed due to the swelling.

Description of the Related Art

Generally, a battery for storing electric energy used for a vehicle or the like includes battery modules that output a voltage of a predetermined magnitude by connecting a plurality of battery cells for outputting a unit voltage. Additionally, the battery is provided in a form of a battery pack that outputs a desired voltage by again connecting the plurality of battery modules.

The conventional battery pack has a structure in which the plurality of battery modules including stacked battery cells are arranged in a stacking direction of the battery cells, end plates are disposed at a front end of an outermost battery module and at a rear end of the outermost battery module opposite thereto in parallel with the stacking direction of the battery cells, and both ends of a plurality of support bars are coupled to the two end plates. Such a conventional battery pack is a structure in which the support bar and the end plate fixed by the support bar apply a surface pressure to a stacked structure of the battery cells when the swelling occurs in the battery cells.

Accordingly, since the structure of applying the surface pressure to the battery which is applied to the conventional battery pack includes the support bar fixed to the end plate, it is difficult to uniformly maintain the surface pressure due to a thickness dispersion between the plurality of stacked battery cells, a deterioration dispersion between the plurality of stacked battery cells, and a dispersion in a mechanism manufacturing process, and the like.

In particular, when the swelling greater than expected occurs in the battery cell or since the amount of swelling is different based on a current load, a temperature increase, a state of charge (SOC) range, a remaining time of battery charge, or the like other than a cause due to a deterioration in the battery cell itself, the conventional surface pressure structure of the battery pack has difficulty to uniformly apply the surface pressure to the stacked structure of the battery cells. Additionally, in a severe case, the support bar and the end plate coupling may be damaged. In the conventional surface pressure structure of the battery pack, the support bar is required to be fixed to the end portion of the end plate. However, since the battery cell causes the greater swelling at the central part thereof, it is difficult to uniformly maintain the surface pressure applied to the battery cell central portion and the end portion of the battery cell.

The contents described as the related art have been provided merely for assisting in the understanding for the background of the present invention and should not be considered as corresponding to the related art known to those skilled in the art.

SUMMARY

Accordingly, the present invention provides a battery pack capable of uniformly applying a surface pressure to a stacked structure of the battery cells when swelling occurs in the battery cells, and sufficiently securing rigidity of the structure even when the swelling occurs excessively.

According to an exemplary embodiment of the present invention, a battery pack may include: a battery module having a plurality of stacked battery cells and an end cover disposed on an outer side of the battery module to face an outermost battery cell; a case configured to have a receiving space in which the battery module may be accommodated, the receiving space having a side wall facing the end cover; and a surface pressure patch disposed between the end cover of the battery module and the side wall which are disposed in the receiving space, and configured to apply a pressure to an inside of the battery module when an interval between the end cover and the side wall is closer than a predetermined interval due to swelling of the battery cell.

The surface pressure patch may be attached to the end cover. Additionally, the surface pressure patch may have a bar shape with a bending portion, and may have a structure in which a first part of a region defined by the bending portion is attached to the end cover and a second part in contact with the side wall when the interval between the end cover and the side wall is closer than the predetermined interval. The surface pressure patch may include a plurality of bonding regions attached to the end cover and a contact region which connects between the plurality of bonding regions, is spaced apart from the end cover by a predetermined interval in a direction of the side wall by the bending porting, and is in contact with the side wall when the interval between the end cover and the side wall is closer than the predetermined interval.

Particularly, the surface pressure patch may include a plurality of bonding regions attached to the end cover and a contact region which extends in a direction of the side wall from both sides of the bonding region by the bonding portion. Additionally, the surface pressure patch may include a distal part that contacts the side wall when the interval between the end cover and the side wall is closer than the predetermined interval. The battery pack may further include: a surface pressure pad configured to be disposed at a part of the surface pressure patch that contacts the side wall when the interval between the end cover and the side wall is closer than the predetermined interval.

A region in which the surface pressure patch is attached to the end cover may be a central part of the end cover. The surface pressure patch may be attached to the side wall. Additionally, the surface pressure patch may have a bar shape with a bending portion, and a structure in which a part of a region defined by the bending portion is attached to the side wall and the remaining region other may be in contact with the end cover when the interval between the end cover and the side wall is closer than the predetermined interval. The surface pressure patch may be disposed so that the region in which the surface pressure patch is attached to the end cover is a central part of the end cover. The battery back may further include: a bracket having both ends fixed to both side walls on both sides of the battery module, respectively.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery pack according to various exemplary embodiment of the present invention will be described with reference to the accompanying drawings.

Figure 1:
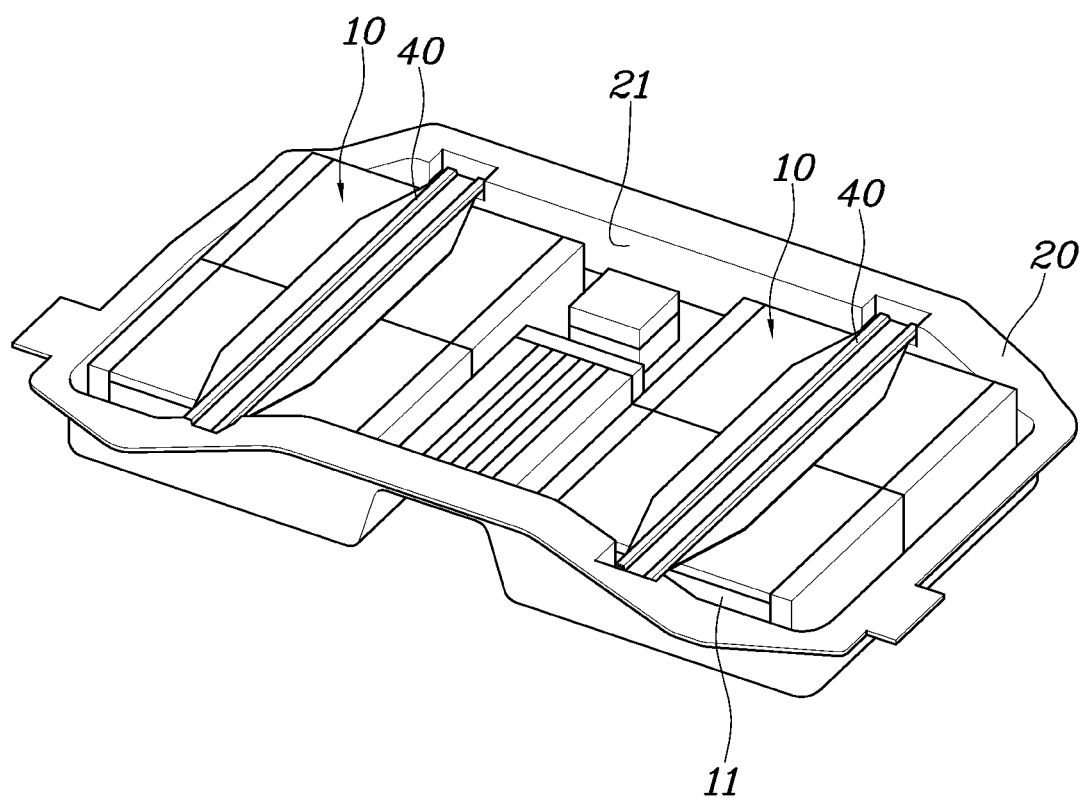
FIG. 1 is a perspective view of a battery pack according to an exemplary embodiment of the present invention.
Figure 2:
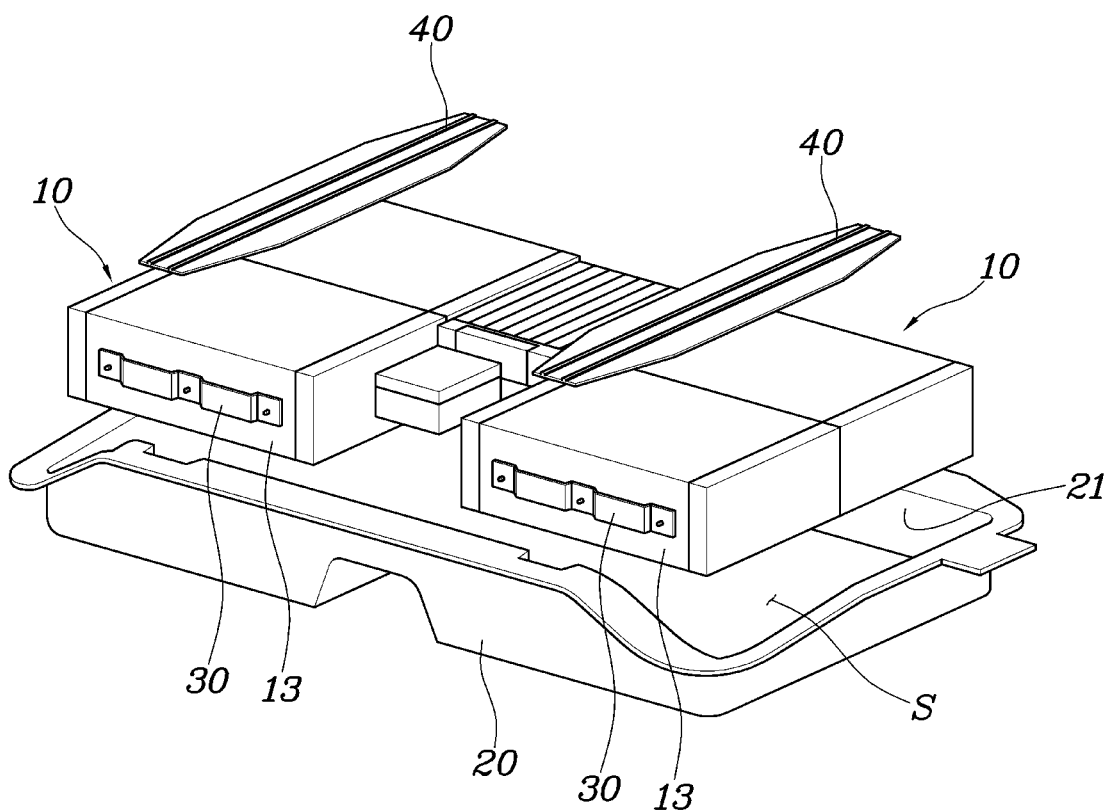
FIG. 2 is a detailed view of the battery pack according to the exemplary embodiment of the present invention shown in FIG. 1.
Figure 3:
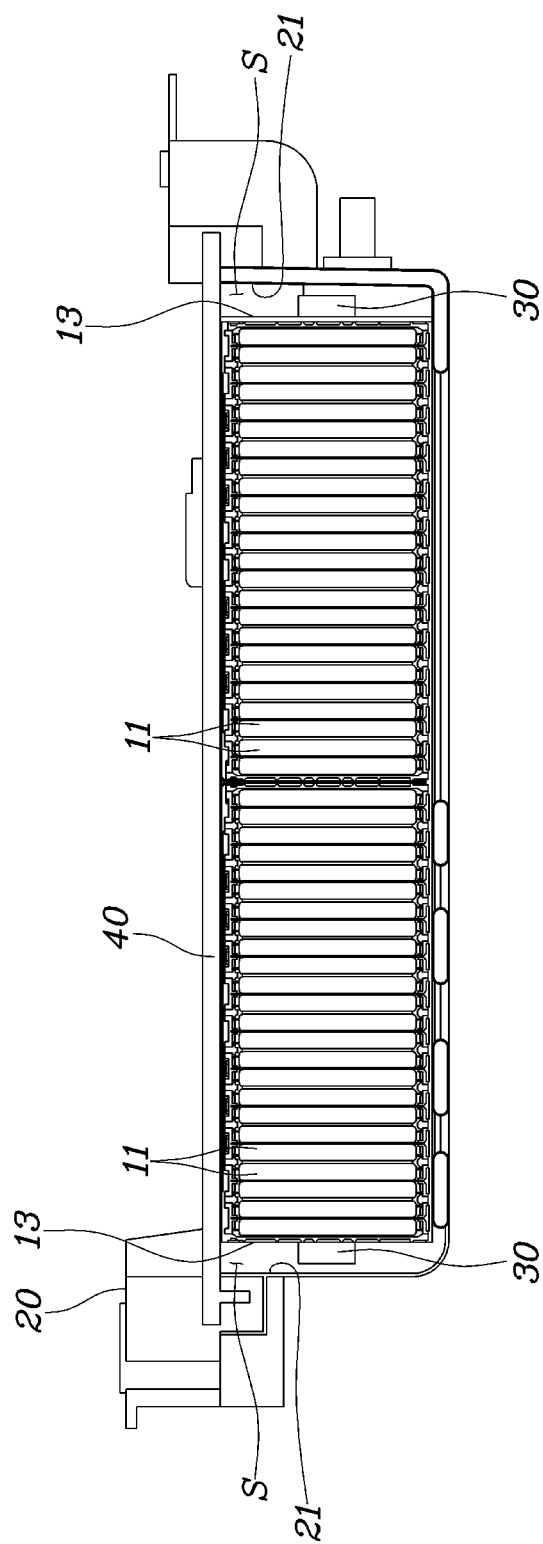
FIG. 3 is a cross-sectional view of the battery pack according to the exemplary embodiment of the present invention shown in FIG. 1.

FIG. 1 is a perspective view of a battery pack according to an exemplary embodiment of the present invention, FIG. 2 is a detailed view of the battery pack according to the exemplary embodiment of the present invention shown in FIG. 1, and FIG. 3 is a cross-sectional view of the battery pack according to the exemplary embodiment of the present invention shown in FIG. 1.

Referring to FIGS. 1 to 3, a battery pack according to an exemplary embodiment of the present invention may include a battery module 10, a case 20, and a surface pressure patch 30. The battery module 10 may include battery cells 11 stacked in one direction in parallel with each other. In the battery cell module 10, the battery cells 11 may be disposed to face each other. In addition, the battery module 10 may include end covers 13 disposed in parallel with the battery cells 11 on an outer side of an outermost battery cell to face outermost battery cells of the stacked structure of the battery cells 11 on both sides of the stacked structure of the battery cells 11. The end cover 13 may form an outermost surface of the battery module 10.

According to the structure of the battery module 10, when swelling occurs in the battery cell 11, a force pushing the end cover 13 outward is applied. Although not separately designated by reference numerals, the battery module 10 may include a lower frame on which the battery cell 11 is mounted, an upper cover, a cover installed before and after the module, a circuit structure that manages the battery module, and the like.

The case 20 may accommodate at least one battery module 10 and may include a receiving space S for receiving and seating the battery module 10. The receiving space S may be formed by a side wall 21 that extends upward from a side end portion of a bottom surface of the case 20. In other words, the receiving space S of the battery may be formed by the bottom surface of the case 20 and the side wall 21, and the battery module 10 may be seated at a predetermined position within the receiving space S.

In particular, the side wall 21 of the case 20 may have a height facing the end cover 13 of the battery module 10. In other words, the side wall 21 may have a height that corresponds to the end cover 13. In addition, the battery module 10 may be spaced apart from the side wall 21 by a predetermined interval when the battery module 10 is seated within the case 20. When the surface pressure patch 30 is attached to the end cover 13 of the battery module 10, the battery module 10 may be seated with a predetermined interval maintained between the side wall 21 and the surface pressure patch 30 while the swelling does not occur in the battery cell 11. When the surface pressure patch 30 is attached to an inner surface of the side wall 21 rather than the end cover 13 of the battery module 10, the battery module 10 may be seated with the predetermined interval maintained between the surface pressure patch 30 and the end cover 13 of the battery module 10 while the swelling does not occur in the battery cell 11.

The surface pressure patch 30 may be disposed between the end cover 13 of the battery module 10 disposed in the receiving space and the side wall 21 of the case 20. The surface pressure patch 30 may be configured to provide pressure to the inside of the battery module 10 when the interval between the end cover 13 and the side wall 21 is closer than the predetermined interval due to the swelling of the battery cell 11 in the battery module 10.

The swelling may occur in the battery cell 11 due to a deterioration in durability or the like, and in the battery module 10 in which a plurality of battery cells 11 are stacked facing each other, the pressure may be generated in the stacked direction of the battery cell 11 due to the swelling of the battery cell 11. The pressure generated due to the swelling may deform the end cover 13 disposed in contact with the outermost battery cells on both sides of the stacked structure of the battery cell 11 or damage the battery module 10 itself. Particularly, when the swelling occurs concentrating on a specific portion of the battery cell 11, the battery module 10 may be more easily deformed or damaged by the concentrated pressure. Therefore, the battery module 10 or the battery pack may prevent the concentration of the pressure due to the swelling of the battery cell 11 and maintain the surface pressure relatively more evenly in the entire area of the battery cell 11, and thus, the structure rigidity of the battery module 10 or the battery pack may be secured and the life of the battery may be improved.

According to various exemplary embodiments of the present invention, the side wall 21 of the case 20 of the battery pack and the end cover 13 of the battery module 10 face each other and the surface pressure patch 30 may be disposed therebetween. Therefore, the surface pressure patch 30 disperses the concentration of the pressure on the end cover 13 of the battery module 10 while supporting the side wall 21, thereby uniformly applying the surface pressure to the battery module 10 and securing the sufficient rigidity.

Figure 4:
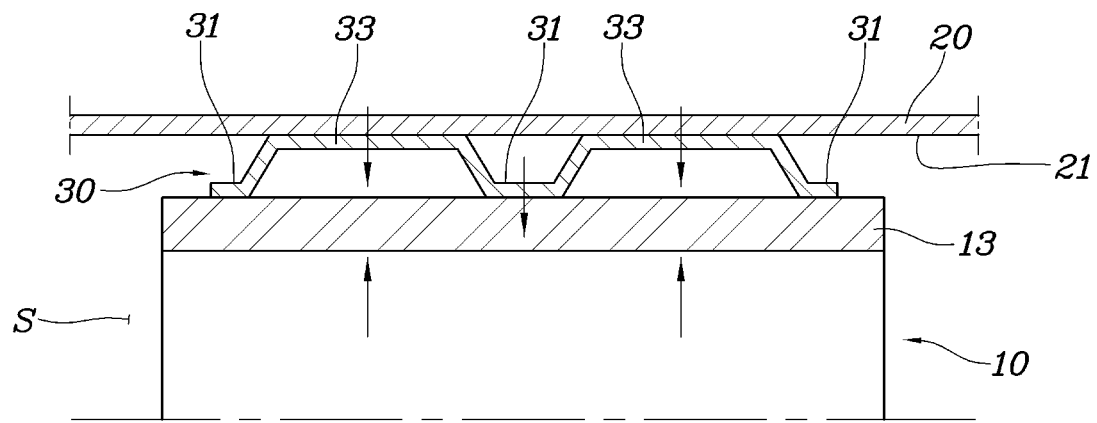
FIGS. 4 to 6 are diagrams showing a structure of a surface pressure patch of a battery pack according to various exemplary embodiments of the present invention.
Figure 5:
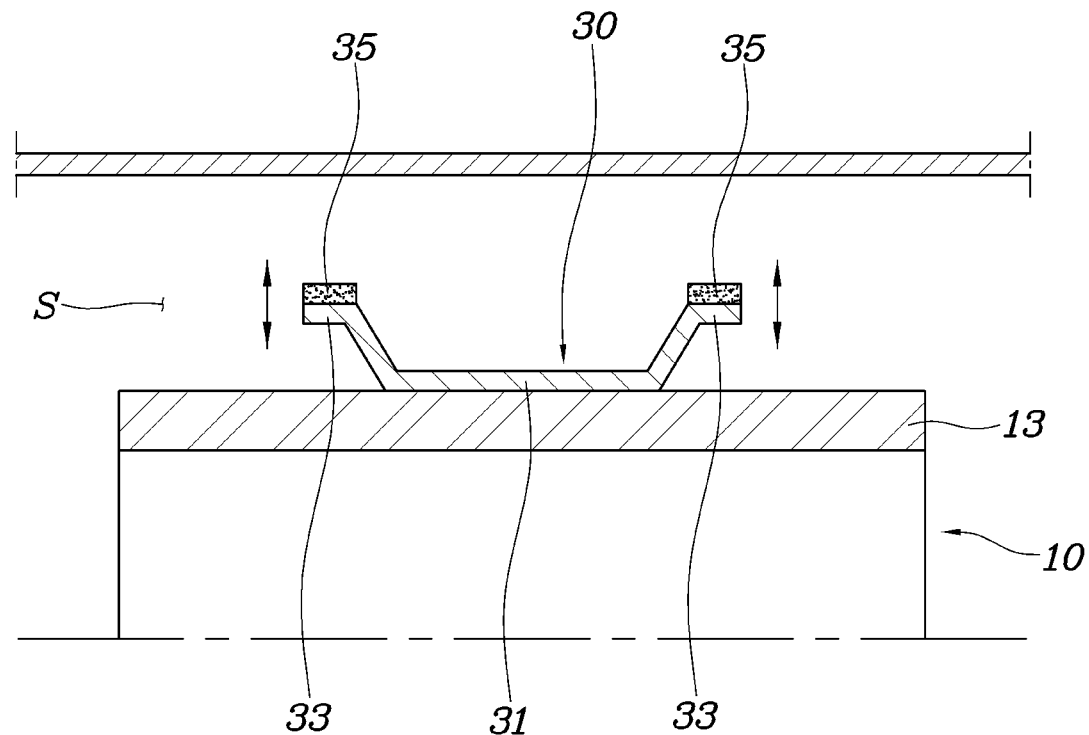
Figure 6:
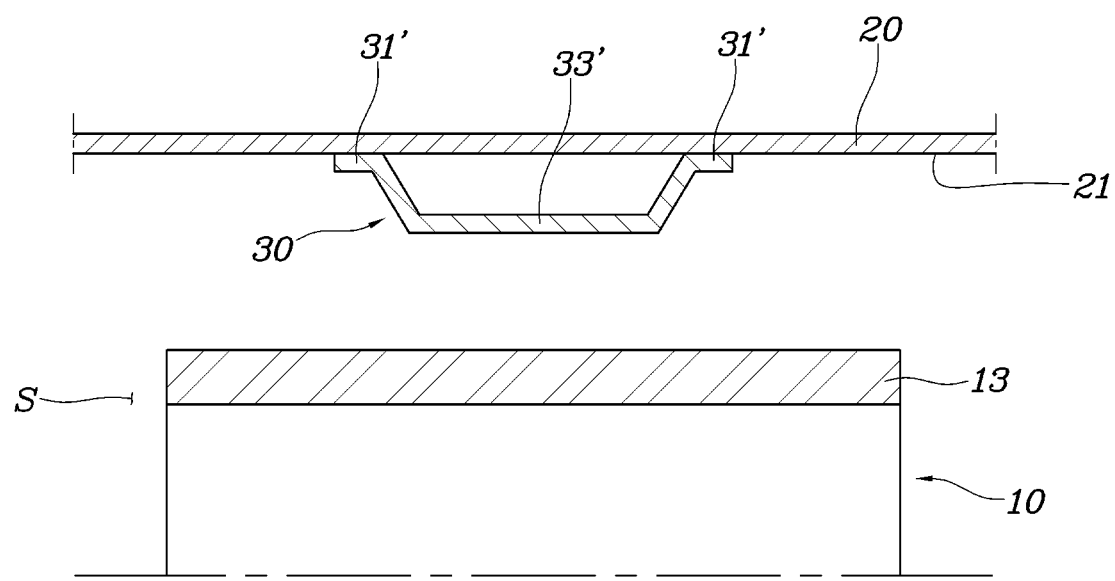

FIGS. 4 to 6 are diagrams showing a structure of a surface pressure patch of a battery pack according to various exemplary embodiments of the present invention. In particular, FIGS. 4 and 5 shows the exemplary embodiment in which the surface pressure patch is attached to the outer surface of the end cover 13 of the battery module 10, and FIG. 6 shows the exemplary embodiment in which the surface pressure patch is attached to the inner surface of the side wall 21 of the case 20 facing the end cover 13 of the battery module 10.

Referring to FIGS. 4 and 5, the surface pressure patch 30 of the battery pack according to the exemplary embodiment of the present invention may have a bar shape with a bending portion. In particular, and the surface pressure path 30 may have a structure in which a first region 31 is attached to the end cover 13 and a second region 33 in contact with the side wall 21 when the interval between the end cover 13 and the side wall 21 is closer than the predetermined interval. In other words, the surface pressure patch 30 may be formed of convex and concave regions forming the bent bar shape where the first region is the concave portion and the second region is the convex portion.

The surface pressure patch 30 of the exemplary embodiment shown in FIG. 4 may include a plurality of bonding regions 31 (e.g., the first region) attached to the end cover 13 and a contact region 33 (e.g., the second region) which connects between the plurality of bonding regions 31. The contact region may be spaced apart from the end cover 13 by a predetermined interval in a direction of the side wall by the bending portion, and may be in contact with the side wall 21 when the interval between the end cover 13 and the side wall 21 is closer than the predetermined interval. In addition, the surface pressure patch 30 of the exemplary embodiment shown in FIG. 5 may have the bonding region 31 attached to the end cover 13 and the contact region 33 which extends in the direction of the side wall 21 from both sides of the bonding region 31 by the bonding portion and has a distal part that contacts the side wall 21 when the interval between the end cover 13 and the side wall 21 is closer than the predetermined interval.

In particular, the exemplary embodiment shown in FIG. 5 may further include a surface pressure pad 35 disposed at a position in contact with the side wall 21 of the surface pressure patch 30. The surface pressure pad 35 may be made of a soft material by removing the non-uniform contact state of the contact surface when the surface pressure patch 30 of a hard material (e.g., metal material) and the side wall 21 of the case 20 may be in contact with each other to generate the pressure transferred by the contact surface uniform. Although not shown, in the exemplary embodiment shown in FIG. 4, the corresponding region of the surface pressure pad 35 contacting the side wall 21 may include the surface pressure pad.

According to the exemplary embodiment shown in FIGS. 4 and 5, when the interval between the end cover 13 and the side wall 21 is closer than the predetermined interval due to the swelling of the battery cell 11 to cause the surface pressure patch 30 attached to the end cover 13 to contact the side wall 21, the pressure in the opposite direction to the pressure generated due to the swelling is applied to the end cover 13 by the support of the side wall 21. In particular, the pressure applied in the direction opposite to the pressure generated due to the swelling in the region in which the surface pressure patch 30 is attached increases. In other words, the pressure due to the swelling acting on the region to which the surface pressure patch 30 is attached may be dispersed by the surface pressure patch 30. [NO Please provide an exemplary predetermined interval or range related thereto.]

The surface pressure between the battery cells 11 in the battery module 10 may be equalized by dispersing the pressure concentration due to the swelling by the action of the surface pressure patch 30. The region in which the surface pressure patch 30 is attached to the end cover 13 may be the central part of the end cover 13 since the swelling of the battery cell 11 is concentrated on the center thereof.

Referring to FIG. 6, a surface pressure patch 30' may be attached to the side wall 21 of the case 20. According to the exemplary embodiment of FIG. 6, the surface pressure patch 30' may have a bar shape with a bending portion similar to the exemplary embodiment of FIGS. 4 and 5, and may be implemented in a form in which a first region 31' defined by the bonding portion may be attached to the side wall 21 and a second region 33' may be in contact with the end cover 23 when the interval between the end cover 13 and the side wall 21 is closer than the predetermined interval.

Although not shown, similar to the exemplary embodiment of FIG. 5, the surface pressure pad may be disposed in a region in which the surface pressure patch 30' is in contact with the end cover 13. In addition, similar to the exemplary embodiment of FIGS. 4 and 5, considering that the swelling of the battery cell 11 is concentrated on the central part thereof, the second region 33' in which the surface pressure patch 30' is in contact with the end cover 13 may be disposed to be the central part of the end cover 13.

As described above, in the battery pack according to the various exemplary embodiments of the present invention, the side walls 21 of the case 20 may be disposed on both sides of the region in which the battery module 11 is disposed, and the surface pressure patch 30 supports the side wall 21 to apply the pressure in the opposite direction to the swelling direction, thereby removing the surface pressure concentration due to the swelling and forming the uniform surface pressure. Therefore, when the surface pressure patch 30 contacts both side walls 21 of the case 20, the pressure may be applied due to the swelling. Therefore, to increase the effect of forming the uniform surface pressure by further increasing the support force by the side wall 21, as shown in FIGS. 1 to 3, the exemplary embodiment of the present invention may further include a bracket 40 that secures the rigidity having both ends fixed to both side walls on both sides of the battery module 20, respectively.

As described above, the battery pack according to various exemplary embodiments of the present invention may include the surface pressure patch for dispersing the surface pressure between the side wall of the case and the end cover of the battery module to which the pressure is applied due to the swelling of the battery cell to disperse the pressure due to the swelling and in particular, achieve the improved surface pressure uniformization by dispersing the surface pressure to the position on which the pressure is concentrated due to the swelling. Accordingly, by generating a more uniform surface pressure, the battery pack according to various exemplary embodiments of the present invention may secure improved rigidity of the battery structure as compared with the battery pack structure in which the coupling structure is simply formed by using the end plate and the support bar.

The effects that may be achieved by the exemplary embodiments of the present invention are not limited to the above-mentioned effects. In other words, other effects that are not mentioned may be obviously understood by those skilled in the art to which the present invention pertains from the following description.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A battery pack, comprising:
a battery module including a plurality of battery cells stacked in one direction in parallel with each other and an end cover disposed on an outer side to face an outermost battery cell;
a case including a receiving space in which the battery module is received, the receiving space having a side wall facing the end cover; and
a surface pressure patch disposed between the end cover of the battery module and the side wall which are disposed in the receiving space, and configured to apply a pressure to an inside of the battery module when an interval between the end cover and the side wall is closer to a predetermined interval due to swelling of the plurality of battery cells,
wherein the surface pressure patch is attached to the end cover,
wherein the surface pressure patch has a bar shape with a bending portion,
wherein the surface pressure patch includes a bonding region attached to the end cover and a contact region which extends in a direction of the side wall from both sides of the bonding region by the bonding portion and has a distal part that contacts the side wall when the interval between the end cover and the side wall is closer than the predetermined interval, and
wherein a surface pressure pad is disposed only at the contact region of the surface pressure patch.

2. The battery pack of claim 1, wherein the surface pressure patch includes a first region defined by the bending portion and attached to the end cover and a second region in contact with the side wall when the interval between the end cover and the side wall is closer than the predetermined interval.

3. The battery pack of claim 1, wherein the surface pressure patch includes a plurality of bonding regions attached to the end cover and a contact region which connects between the plurality of bonding regions, is spaced apart from the end cover by a predetermined interval in a direction of the side wall by the bending portion, and is in contact with the side wall when the interval between the end cover and the side wall is closer than the predetermined interval.

4. The battery pack of claim 1, wherein a region in which the surface pressure patch is attached to the end cover is a central part of the end cover.

* * * * *